United States Patent [19]

Polizzano

[11] Patent Number: 4,840,803
[45] Date of Patent: Jun. 20, 1989

[54] PROCESS AND DOUGH COMPOSITION FOR PRODUCING MULTI-TEXTURED COOKIES CONTAINING HARD FATS

[75] Inventor: Robert A. Polizzano, Teaneck, N.J.

[73] Assignee: Nabisco Brands, Inc., Parsippany, N.J.

[21] Appl. No.: 786,088

[22] Filed: Oct. 10, 1985

[51] Int. Cl.⁴ ............................................. A21D 13/00
[52] U.S. Cl. ....................................... 426/94; 426/549; 426/560; 426/601
[58] Field of Search ................... 426/94, 549, 560, 601

[56] References Cited

U.S. PATENT DOCUMENTS

| | | | |
|---|---|---|---|
| 3,350,207 | 10/1967 | Koren et al. | |
| 3,917,856 | 11/1975 | Wong et al. | 426/94 |
| 4,344,969 | 8/1982 | Youngquist et al. | 426/18 |
| 4,360,534 | 11/1982 | Brabbs et al. | 426/94 |
| 4,390,561 | 6/1983 | Blair | 426/607 |
| 4,444,799 | 4/1984 | Vanderveer | 426/549 |
| 4,455,333 | 6/1984 | Hong et al. | 426/94 |
| 4,456,625 | 6/1984 | Durst | 426/106 |
| 4,503,080 | 3/1985 | Brabbs et al. | 426/94 |
| 4,511,318 | 4/1985 | Kolodesh et al. | 426/94 |
| 4,511,585 | 4/1985 | Durst | 426/106 |
| 4,528,900 | 8/1985 | Simelunas | 99/450.7 |
| 4,534,726 | 8/1985 | Simelunas | 425/363 |
| 4,578,027 | 3/1986 | Koppa et al. | 425/298 |
| 4,579,744 | 4/1986 | Thulin | 426/283 |
| 4,582,711 | 4/1986 | Durst | 426/128 |
| 4,624,856 | 11/1986 | Vanderveer et al. | 426/549 |
| 4,664,921 | 5/1987 | Seiden | 426/94 |
| 4,668,522 | 5/1987 | Cappel et al. | 426/94 |

FOREIGN PATENT DOCUMENTS 0031718 7/1981 European Pat. Off. .

OTHER PUBLICATIONS

Swern, D. et al., "Bailey's Industrial Oil and Fat Products", Interscience Publ., N.Y. 1964, pp. 362–365.
"Paulicka, Specialty Fats", Journal of the American Oil Chemist's Society, 53(6), 421–424 (1976).

*Primary Examiner*—Joseph Golian
*Attorney, Agent, or Firm*—Richard Kornutik

[57] ABSTRACT

In multi-textured cookies having a soft and moist center containing a humectant and a firm outer layer, the outer layer contains a hard vegetable fat having a solid fat index of at least 40 percent at 70° F.

23 Claims, No Drawings

PROCESS AND DOUGH COMPOSITION FOR PRODUCING MULTI-TEXTURED COOKIES CONTAINING HARD FATS

FIELD OF THE INVENTION

This invention relates to a process and dough composition for producing multi-textured cookies containing hard fats. More specifically, this invention relates to a process and dough composition for producing multi-textured cookies which have a outer layer the texture of which is made firmer by including in the casing dough a hard fat.

BACKGROUND OF THE INVENTION

U.S. Pat. No. 4,444,799 discloses the incorporation of a firm edible gel into a base dough for the preparation of soft edible baked products, especially soft cookies. High fructose corn syrup and sucrose syrup are disclosed as suitable edible viscous liquids for preparing edible firm gels which impart softness to baked products. However, a sucrose-based gel, for example, has a higher viscosity than a sucrose syrup of the same relative proportions of sucrose and water.

Incorporation of such gels into a dough imparts greater viscosity to the resulting dough than would incorporation of the same amounts of sucrose and water as: (1) a sucrose syrup or, (2) separately added sucrose and water. To facilitate dough mixing and to provide the desired consistency to the dough for proper working and shaping, larger quantities of water are added to the dough than would otherwise be needed if the sucrose was not present in a gel. These beneficial effects of water addition upon dough forming and machineability becomes more significant as greater proportions of sucrose are replaced by a sucrose-based gel.

In the preparation of a multi-textured cookie, retention of the extra water in the baked dough can result in: (1) a water activity which renders the product microbially unstable and/or (2) a loss of firmness in the outer dough due to moisture migration from the inner dough to the outer dough. However, retention of extra water within the filling dough or inner dough is desirable from the standpoint of providing a moist and soft texture.

In addition, as long as the water activity of the baked outer or casing dough is lower than the water activity of the sucrose gel, water will tend to migrate from the gel to the baked outer dough thereby gradually resulting in a loss of dual texture. Depending upon factors such as the final moisture content, the level of sucrose gel used in the filling, the relative amounts of filling and casing dough, and the absorptive properties of the flour, a multi-textured cookie having sucrose in the casing and a sucrose-based gel in the filling may exhibit substantial loss in duality of textures after one to two months even if properly packaged. Similar problems may be encountered in multi-textured cookies which do not contain a humectant gel.

In the present invention, a "firming agent" is included in the outer layer of a multi-textured cookie to aid in retaining a firm texture in the outer layer at high water contents during storage.

SUMMARY OF THE INVENTION

This invention provides a process for preparing a multi-textured cookie, in which process flour, a humectant and fat or shortening are mixed to produce a first cookie dough, and flour, a sugar and fat or shortening are mixed to produce a second cookie dough, at least about 12 percent by weight of the fat or shortening in the second cookie dough being a hard vegetable fat having a solid fat index of at least about 40 percent at 70° F. A portion of the first cookie dough is then enrobed within a portion of the second cookie dough to produce a composite dough piece, and this composite dough piece is baked to form a multi-textured cookie with a center having a soft and moist texture and a firm outer layer.

This invention also provides a cookie dough composition for producing a multi-textured cookie, this cookie dough composition comprising a center formed of a first cookie dough comprising flour, a humectant and fat or shortening and bakeable to a soft and moist texture, and an outer layer formed of a second cookie dough comprising flour, a sugar and fat or shortening, at least about 12 percent by weight of the fat or shortening in the second cookie dough being a hard vegetable fat having a solid fat index of at least about 40 percent at 70° F., the second cookie dough being bakeable to a firm texture.

The term "hard vegetable fat" is used herein merely as a convenient brief term for a vegetable fat having a solid fat index of at least about 40 percent at 70° F. (21.1° C.). Naturally, the hard vegetable fat used must be "edible" in the sense that the fat must be acceptable for use in a food at the concentrations in which it is used in the second cookie dough, although the hard fat does not have to be one which is palatable, or even one which can safely be eaten, in its pure form.

DETAILED DESCRIPTION OF THE INVENTION

In the present invention, part of the fat or shortening in the dough used to produce the outer layer of a multi-textured cookie is replaced with a hard vegetable fat having a solid fat index of at least 40 at 70° F. (21.1° C.), to aid in retaining a firm texture upon storage, so preserving the contrast between the soft and moist center and the firm outer layer of the multi-textured cookie.

In order that the outer layer of the multi-textured cookie prepared by the process of the present invention may have a sufficiently firm texture to provide the desired contrast in texture between the firm outer layer and the soft and moist center, the hard vegetable fat comprises at least about 12 percent, preferably at least 16 percent by weight of the fat and shortening in the casing cookie dough, exclusive of any fat or shortening in any inclusions such as chocolate chips, nuts, and the like. The optimum amount of hard fat is usually about 21 percent by weight of the fat or shortening in the casing cookie dough.

The hard vegetable fat which is used to replace part of the fat or shortening in the process of the present invention is very different in its properties from the shortenings conventionally used in producing cookies. Conventional shortenings typically have solid fat indices within the range of about 15 to about 25 percent at 70° F. (21.1° C.), in contrast to the 40 percent or more of the hard fat used in the process of the present invention. For example, the shortening sold under the trademark Centrasoy A by the Refined Oil Division of Centralsoya, P.O. Box 1400, Fort Wayne, Ind. 46801, which is used commercially as a shortening in cookies, has a solid fat index of 17–22 percent at 70° F. (21.1° C.) and 6–9 at 104° F.

The present invention can be practiced by using as the hard vegetable fat a partially hydrogenated vegetable oil, conveniently partially hydrogenated soybean and/or cottonseed oil. Hard fats of this type, usually known as hard vegetable butterfats, are readily available commercially and include, for example, the hard fats sold under the trademarks SNAC-KOTE and K.L.X. by the Durkee Industrial Foods Division of SCM Corporation, 900 Union Commerce Building, Cleveland, Ohio 44115. SNAC-KOTE is a hard butterfat designed for coating food items such as biscuits, crackers and confectionery. SNAC-KOTE is a partially hydrogenated vegetable oil (soybean, cottonseed) also containing sorbitan monostearate and polysorbate 60. The material has a drop point (1° C. per minute) of 39.4°–41.6° C. (103°–107° F.) minimum solid fat indices of 59 at 50° F. (10° C.), 50 at 70° F. (21.1° C.), 44 at 80° F. and 9 at 92° F. (33.3° C.), and a maximum solid fat index of 9 at 100° F. (37.8° C.).

K.L.X. is a bland, white, partialy-hydrogenated vegetable oil in flake form and is sold for replacement of part of the shortening in icing formulations and for use in high-fat containing, prepared dry mixes, such as coffee cake and doughnut mixes, to increase the fat level without caking or greasiness. K.L.X. is also used to assist binding of bread mixes to food being breaded and as a candy stabilizer in caramel corn, candy apples and similar foods. K.L.X. has a capillary melting point of 124°–130° F. (51.1°–54.4° C.) and a solid fat index of at least 75 at 100° F. (37.8° C.).

Apart from the inclusion of the hard vegetable fat, the components of the casing cookie dough in the process and dough composition of the present invention can be the same as those used in conventional doughs used to produce the outer layers of multi-textured cookies. The sugar used in the casing cookie dough is preferably sucrose, or a mixture of sucrose and other sugars, e.g., 40% to 60% sucrose, 10% to 40% dextrose and 10% to 40% lactose, the weight percentages being based upon the total sugar solids content of the casing dough. The sugar used in the casing cookie dough may if desired incorporate a minor proportion of a humectant sugar such as high fructose corn syrup, honey, or molasses.

The sugar used in the casing cookie dough desirably contains a minor proportion of dextrose, a reducing sugar which promotes browning and hence helps to create the conventional brown color in the baked multi-textured cookie.

The first or filler cookie dough used in the process and dough composition of the present invention may be any of the cookie doughs known to be capable of producing a soft and moist texture in the center of a multi-textured cookie. As is well known to those skilled in the art a soft and moist texture in the center of a multi-textured cookie can be achieved by including a humectant in the filler cookie dough used to produce this center. When the appropriate amounts of humectants are added to a cookie dough, the product baked from such a dough will possess a plastic, moist and non-hardening crumb structure, which will be retained during storage in conventional packaging for periods greater than two weeks and up to several months.

A wide variety of food-compatible humectants may be employed for imparting a shelf-stable soft and moist texture to the centers of the multi-textured cookies produced by the process of the present invention. Humectants which can be employed include sugar and/or non-sugar ingredients which bind moisture in a baked dough. If a non-sugar humectant is employed, the filler cookie dough may also need to include a sugar to provide the requisite degree of sweetness to the center of the cookie. The binding should be such that the equilibrium rate of moisture loss from the cookie to the environment due to the presence of the humectant is slowed to such a degree that a multi-textured cookie containing the humectant in its center, and having an initial moisture content of at least about 6 percent, retains in its center a soft and pliable texture for at least about 2 weeks, when the cookie is stored in a closed container.

Edible humectant gels such as a humectant sucrose gel and/or a high fructose corn syrup gel can be used, preferably with other humectants, in the filler cookie dough for achieving a soft and moist texture. The preferred humectant gels are those containing high fructose corn syrup. Preparation of the gels and of doughs containing them for producing soft edible baked products having extended shelf life is taught in U.S. Pat. No. 4,444,799. A humectant sucrose gel can be prepared, for example, from a mixture of sucrose syrup, sodium alginate, and a calcium ion source. The gels may also be prepared as taught in pending U.S. application Ser. No. 712,206 filed March 1985, now U.S. Pat. No. 4,624,856, which is a continuation of U.S. application Ser. No. 580,365, filed Feb. 15, 1984, now abandoned which in turn is a continuation-in-part of the application which issued as U.S. Pat. No. 4,444,799. The aforementioned patent and pending application are both incorporated herein by reference in their entirety.

In accordance with the teachings of U.S. application Ser. No. 712,206, now U.S. Pat. No. 4,624,856, a firm gel, capable of being ground is obtained by admixing: (a) from about 0.25 parts by weight to about 4.0 parts by weight, preferably from about 0.5 parts by weight to about 1.5 parts by weight of an edible gum capable of being set by calcium ions, and (b) from about 0.1 parts by weight to about 4 parts by weight, preferably from 0.25 parts by weight to about 1.0 parts by weight of a calcium ion source, said parts being based upon 100 parts by weight of the edible viscous liquid. The ingredients are admixed under high shear mixing conditions which assures an at least substantially lump-free and homogeneous gel.

The edible firm, elastic or rubbery gel is ground into pieces typically at temperatures of from about 65° F. to about 85° F. The ground gel is incorporated into a dough using conventional mixing techniques known in the bakery art. The ground gel which is incorporated into the dough is not discernible as pieces in the baked good upon consumption. The amount of water used to produce the gels generally ranges from about 15% by weight to about 35% by weight, based upon the total weight of gel.

A humectant gel for use in the present invention can be prepared by using sucrose syrup and/or high fructose corn syrup as the edible viscous liquid, sodium alginate as the edible gum, and food grade calcium sulfate dihydrate as the calcium ion source. Other gums which may be employed include potassium alginate, ammonium alginate, carrageenan, guar gum, locust bean gum, starch, protein, Xanthan gum, mixtures thereof, and the like. Other calcium ion sources which may be employed include food grade monocalcium phosphate anhydrous, calcium sulfate, calcium carbonate, calcium lactate, calcium monohydrogen phosphate, dicalcium orthophosphate dihydrate, tricalcium phosphate, calcium chloride, mixtures thereof, and the like. Weight ratios of sodium, alginate/edible calcium ion source in the range of about 1 to 3 are generally used. Propylene glycol and glycerine may be used as dispersing agents for the calcium source or the sodium alginate.

Humectant sugars may be employed alone or in combination with non-humectant sugars (such as sucrose) in the filler cookie dough to impart a soft and moist texture to the center of the multi-textured cookie. Suitable humectant sugars include fructose, dextrose, corn syrups, invert syrups, high fructose corn syrups, honey, molasses, as well as mixtures of one or more of the foregoing humectants with sucrose. For example, a suitable humectant sugar composition for use in the filler cookie dough may comprise about 0 to 87 percent sucrose, with the balance of the sugar being comprised of fructose and/or dextrose employed in the form of crystallized sugar. Alternatively, the balance of the sugar may be provided by the sugar solids content of a corn syrup, honey or a high fructose corn syrup, or another humectant sugar.

Commercially available high fructose corn syrups are prepared by the enzymatic isomerization of dextrose containing corn syrups, and typically possess a sugar solids component of about 40 percent to about 100 percent by weight fructose, with the balance of the non-fructose sugar solids being primarily dextrose plus minor amounts of other monosaccharides. The sugar solids content of commercially available high fructose corn syrups typically ranges from about 70 percent to about 73 percent, up to about 82 percent by weight. Examples of other humectant sugars include maltose, sorbose, mannose, lactose and galactose. When sucrose is employed in the filler cookie dough, the humectant sugar preferably comprises at least about 13 percent, and most preferably at least about 20 percent, by weight of the total sugar content of the filler cookie dough.

In addition to the humectant sugars, a wide variety of humectants which are not sugars and which all possess a low degree of sweetness relative to sucrose may also be employed in the filler cookie dough. For example, the use of glycerol, sugar alcohols such as mannitol, maltitol, xylitol and sorbitol, and other polyols, as humectants is well known in the art. Additional examples of humectant polyols (i.e. polyhydric alcohols) include humectant glycols, hydrogenated glucose syrups, sugar esters, dextrins, and other starch hydrolyzation products. However, the humectant sugars are preferred because of their sweetness.

The total sugar solids content of the casing dough bakeable to the firm outer layer of the cookie of the present invention may range from about 25 to about 150 pounds, typically from about 50 to 110 pounds, per 100 pounds of the flour component of the dough, depending upon the degree of sweetness desired in the outer portion of the cookie, and the type of cookie.

In the filler dough bakeable to a soft and moist texture, on the basis of 100 pounds of the flour component of the filler dough, the humectant plus any sucrose or other sweetener employed (e.g., artificial sweetners) in the formulation may be present in amounts ranging from about 25 to about 150 pounds depending on the degree of sweetness and humectant properties desired in the baked product.

The total sugar solids content (exclusive of inclusions) of the filler dough may typically be from about 50 to about 110 pounds of sugar per 100 pounds of the flour component of the filler dough.

The flour employed in the filler and casing cookie doughs used in the process and dough composition of the present invention are selected from conventional ingredient lines. The flour component may be any comminuted cereal grain or edible seed meal such as wheat flour, corn flour, corn starch, modified starch, rice flour, potato flour, barley flour, or the like. Wheat flour is preferred and may be bleached or unbleached. Bleached flour tends to produce less oven spread during baking.

The shortening or fat employed in this filler dough may be any edible fat or oil or mixtures thereof suitable for baking applications, and may further include conventional food-grade emulsifiers. The shortening or fats employed in the filler dough may also be used in the casing dough. The shortening may be present in the filler dough in amounts ranging from about 20 percent to about 80 percent of the weight of flour in the dough. In the casing dough the total amount of shortening or fat, which includes the hard butter fat, may also range from about 20 percent to about 80 percent of the weight of the flour in the dough.

Each of the doughs may contain up to about 5 percent by weight of a leavening system, based upon the weight of the flour in each dough. The leavening system employed in each dough may be the same or different.

In addition to the foregoing, the filler and casing cookie doughs used in the process and dough compositions of the invention may include other additives conventionally employed in cookies. Such additives may include, for example, milk products or milk by-products, egg or egg by-products, cocoa, vanilla, cereal (oatmeal) as well as inclusions such as nuts, raisins, coconut, flavored chips such as chocolate chips, butterscotch chips and caramel chips, and the like.

The initial moisture content of the casing dough and of the filler dough are each adjusted to provide the desired consistency to the dough to enable proper mixing, working and shaping of each dough and of the coextrudate. The total moisture content of the filler and casing doughs will include any water included as a separately added ingredient, as well as the moisture provided by flour (which usually contains about 12% to 14% by weight moisture), the moisture provided by the optional humectant gel, and the moisture content of other dough additives included in the formulation, such as high fructose corn syrup, invert syrups, or other liquid humectants. Taking into account all sources of moisture in the dough, including separately added water, the total initial moisture content of the casing dough is generally less than about 15% by weight of the dough formulation, exclusive of particulate inclusions such as nuts, raisins, chocolate chips, and the like. A moisture contents about above 15% weight, the dough compositions may tend to stick excessively to processing equipment such as conveyors, dough cutters, and the like. The initial moisture content of the filler cookie dough is generally at least about 15% by weight more than the initial moisture content of the casing cookie dough.

The filler and casing cookie doughs can each be prepared in a conventional manner using a creaming stage and a dough forming stage. To ensure even distribution of the hard vegetable fat throughout the casing cookie dough, the hard vegetable fat is preferably added to the creaming stage. The hard vegetable fat is preferably mixed with at least part of the sugar and fat or shortening in the creaming stage, and thereafter the flour and any remaining sugar and fat or shortening are added to form the finished casing cookie dough. To ensure that the hard vegetable fat does mix in smoothly in the creaming stage, the hard vegetable fat is desirably melted prior to being mixed with the other ingredients present in the creaming stage and thereafter added to the creaming stage in liquid form. Heating the hard vegetable fat to 10°–20° F. (5.56°–11.11° C.) above its melting point is sufficient to permit smooth mixing of the hard vegetable fat with the other ingredients in the creaming stage. It is generally undesirable to heat the hard vegetable fat to very high temperatures, since this may cause oxidation or other changes in the hard vegetable fat.

If flavor chips are to be added to either or both cookie doughs, they are preferably added as the last ingredient to the dough with minimal mixing so as to avoid smearing of the flavored chips into the dough. Before being combined with the casing cookie dough, the filler cookie dough is preferably cooled to about 60° F. to about 65° F. (about 15.6° C. to about 18.3° C.) using carbon dioxide snow to facilitate its transfer to a coextruder.

The two cookie doughs may be combined by coextrusion through concentric dies to obtain a coextrudate rope with the filler cookie dough inside and the casing, firm cookie dough outside. The coextrudate rope is cut into pieces using a reciprocating cutter which severs the rope and stretches the casing, outer dough to close the end portions of the rope so as to obtain a composite dough piece in which a center formed of the filler cookie dough is completely surrounded by an outer layer formed of the casing cookie dough, this composite dough piece thus being bakeable to form a multi-textured cookie.

The composite dough pieces suitably have a weight ratio of the filler dough to the casing dough within the range from about 0.80 to 1.2, approximately equal amounts of each dough being preferred.

The time and temperature of baking are adjusted in accordance with conventional techniques to provide a moisture content in the baked cookie of 6 percent or more. The preferred moisture content ranges from about 7 percent to about 9.5 percent based upon the weight of the baked cookie. The water activity of the baked cookie should be less than about 0.7, preferably less than or equal to about 0.6, to assure microbial shelf stability. While baking time and temperatures will vary for different dough formulations, oven types, etc., in general commercial cookie baking times may range from about 5 minutes to about 15 minutes and baking temperatures for cookies may range from about 250° F. (121° C.) to about 500° F. (260° C.).

The following example is now given, by way of illustration only wherein all parts, ratios and percentages are by weight unless otherwise stated.

EXAMPLE

A filler cookie dough was formulated from the following ingredients:

| Ingredient | Parts by Weight |
| --- | --- |
| Bleached wheat flour | 100.0 |
| Sucrose gel* | 59.0 |
| Sucrose | 25.0 |
| Fructose corn syrup (71% solids, 40% fructose) | 8.33 |
| Modified corn starch | 8.5 |
| Sodium bicarbonate | 1.44 |
| Ammonium bicarbonate (food grade) | 0.25 |
| Sodium acid pyrophosphate no. 4 | 0.31 |
| Vegetable shortening | 38.0 |
| Minor flavoring and coloring ingredients (spray-dried whole eggs, salt, caramel and vanilla) | 3.33 |
| Water | 33.0 |
| Chocolate drops (4200 count) | 75.0 |
| | 352.16 |

*The sucrose gel used was a grindable humectant sucrose gel prepared from a mixture comprising 100 parts by weight sucrose syrup (approximately 67 percent by weight solids), 1 part sodium alginate gum (Kelco gel LV sold by Kelco Division, Merck & Co.,) and 0.6 parts by weight hydrous calcium sulfate. The gel was ground in a low-shear meat-grinder apparatus before incorporation into the dough.

The filler cookie dough was prepared using an upright mixer. The sugar, vegetable shortening, modified corn starch, spray-dried whole eggs, salt and vanilla were placed in the mixing bowl and mixed for three minutes. The ammonium bicarbonate was then added dissolved in part of the water, together with the caramel, the remaining water and the fructose corn syrup, and the mixing continued for a further two minutes. The sucrose gel was added and, with continued mixing, carbon dioxide snow was introduced into the mixture to cool the mixture to a final temperature of 60°–62° F. (15.6°–16.7° C.). After the mixture had been cooled to this temperature, mixing was continued for a further one minute, the flour, sodium bicarbonate and sodium acid pyrophosphate added and the mixing continued for a further three minutes. Finally, the chocolate drops were added and the mixing continued for a further one minute to produce the finished filler cookie dough.

A casing cookie dough was formulated from the following ingredients:

| Ingredient | Parts by Weight |
| --- | --- |
| Bleached wheat flour | 100.0 |
| Sucrose | 70.0 |
| Vegetable shortening (Solid fat index 17–22 percent at 70° F. and 6–9 at 104° F.) | 37.5 |
| Snac-kote hard vegetable fat (Solid fat index 50 percent minimum at 70° F.) | 12.5 |
| Soybean spray oil (Solid fat index 13–18 at 70° F., less than 13 at 80° F. and essentially completely liquid at 100° F.) | 10.0 |
| Dextrose monohydrate | 5.0 |
| Molasses | 2.5 |
| Sodium bicarbonate | 2.13 |
| Sodium acid pyrophosphate | 0.75 |
| Minor flavoring and coloring ingredients (salt, spray-dried whole eggs and vanilla) | 2.64 |
| Water | 17.0 |
| Chocolate drops (4,800 count) | 50.0 |
| | 310.02 |

The casing cookie dough was formulated using the same mixer as in the preparation of the filler cookie dough described above. Half of the sucrose, together with the vegetable shortening, dextrose, salt, spray-dried eggs, vanilla and soybean oil were added to the mixer. The hard vegetable fat was then heated to 120° F. (48.9° C.), which was about 15° F. (8.33° C.) above its melting point, and added in liquid form to the mixer. The resulting mixture was mixed for three minutes. Next, the molasses, caramel and water were added and mixing continued for a further one minute. The flour, sodium bicarbonate and sodium acid pyrophosphate were then added and the mixing continued for a further two minutes. Finally, the chocolate drops were added and the mixing continued for a final one minute to prepare the finished casing cookie dough.

The filler and casing cookie doughs were then combined by coextrusion through a concentric die into a coextrudate rope in which a cylinder of the filler cookie dough was surrounded by the casing cookie dough. This rope was severed with a reciprocating cutter having hemispherically shaped dough forming sections to form composite dough pieces in which a center comprising approximately 6.5 grams of the filler cookie dough was surrounded by an outer layer comprising approximately 6.5 grams of the casing cookie dough. These composite dough pieces were then baked at 350° F. (177° C.) for 7 minutes. The multi-textured cookies thus produced were then stored in a closed container for 21 days. After this storage, the cookies were weighed and measured. The count per pound was found to be 35, and the diameter 2 5/32 inch (55 mm.). A stack of five of the cookies had a height of 1¾ inch (44 mm.). The pH of a 10 percent aqueous dispersion of the cookies was 7.2. The Agtron color of the cookies was 29 on the upper surface and 23 on the lower surface.

Control cookies were prepared using the same filler and casing doughs except that the Snac-kote was omitted from the casing dough. The moisture content and equilibrium relative humidity of the cookies of the invention and the control cookies were tested immediately after cooling and 3 and 5 weeks later. The results were as follows:

|  | Cookies of the Invention | | |
| --- | --- | --- | --- |
|  | Initial | 3 weeks | 5 weeks |
| % Moisture | 8.77 | 8.18 | 7.50 |
| % ERH | 69.7 | 69.4 | 69.0 |
|  | Control Cookies | | |
|  | Initial | 3 weeks | 5 weeks |
| % Moisture | 7.41 | 7.25 | 7.36 |
| % ERH | 68.0 | 67.4 | 70.0 |

Up to 5 weeks, the cookies of the invention retained the desired firm outer layer and moist center, while the control cookies were dry and crumbly.

I claim:

1. A process for preparing a multi-textured cookie which process comprises:
   mixing flour, a humectant and fat or shortening to produce a first cookie dough;
   mixing flour, a sugar and fat or shortening, to produce a second cookie dough, at least about 12 percent by weight of the fat or shortening in the second cookie dough being a hard vegetable fat having a solid fat index of at least about 40 percent at 70° F., the remaining fat or shortening used in the second cookie dough having a solid fat index in the range of from about 15 to about 25 percent at 70° F.;
   enrobing a portion of the first cookie dough within a portion of the second cookie dough to produce a composite dough piece; and
   baking the composite dough piece to form a multi-textured cookie with a center having a soft and moist texture and a firm outer layer.

2. A process according to claim 1 wherein the hard vegetable fat comprises at least about 16 percent by weight of the fat and shortening in the second cookie dough.

3. A process according to claim 1 wherein the hard vegetable fat comprises about 21 percent by weight of the fat and shortening in the second cookie dough.

4. A process according to claim 1 wherein the hard vegetable fat has a solid fat index of at least about 50 percent at 70° F.

5. A process according to claim 1 wherein the hard vegetable fat comprises a partially hydrogenated vegetable oil.

6. A process according to claim 5 wherein the hard vegetable fat comprises partially hydrogenated soybean and/or cottonseed oil.

7. A process according to claim 1 wherein the sugar used in the second cookie dough comprises sucrose.

8. A process according to claim 1 wherein, in the preparation of the second cookie dough, the hard vegetable fat is melted before being added to the other components of the second cookie dough.

9. A process according to claim 8 wherein, in the preparation of the second cookie dough, the melted hard vegetable fat is mixed with at least part of the sugar and fat or shortening in a creaming stage, and thereafter the flour and remaining sugar and fat or shortening are added to form the finished second cookie dough.

10. A process according to claim 1 wherein the humectant in the first cookie dough comprises a sucrose gel.

11. A process according to claim 1 wherein the humectant in the first cookie dough comprises a high fructose corn syrup gel.

12. A process according to claim 1 wherein the baking is continued until the moisture content of the cookie is in the range of about 7 to about 9.5 percent by weight.

13. A composition according to claim 12 wherein the sugar in the second cookie dough comprises sucrose.

14. A composition according to claim 12 wherein the humectant in the first cookie dough comprises a sucrose gel.

15. A process according to claim 12 wherein the humectant in the first cookie dough comprises a high fructose corn syrup gel.

16. A multi-textured cookie having a center with a soft and moist texture and a firm outer layer produced by the process of claim 1.

17. A cookie dough composition for producing a multi-textured cookie, the cookie dough composition comprising a center formed of a first cookie dough comprising flour, a humectant and fat or shortening and bakeable to a soft and moist texture, and an outer layer formed of a second cookie dough comprising flour, a sugar and fat or shortening, at least about 12 percent by weight of the fat or shortening in the second cookie dough being a hard vegetable fat having a solid fat index of at least about 40 percent at 70° F., the remaining fat or shortening used in the second cookie dough having a solid fat index in the range of from about 15 to about 25 percent at 70° F., the second cookie dough being bakeable to a firm texture.

18. A composition according to claim 17 wherein the hard vegetable fat comprises at least about 16 percent by weight of the fat and shortening in the second cookie dough.

19. A composition according to claim 17 wherein the hard vegetable fat comprises about 21 percent by weight of the fat and shortening in the second cookie dough.

20. A composition according to claim 17 wherein the hard vegetable fat has a solid fat index of at least about 50 percent at 70° F.

21. A composition according to claim 17 wherein the hard vegetable fat comprises a partially hydrogenated vegetable oil.

22. A composition according to claim 18 wherein the hard vegetable fat comprises partially hydrogenated soybean and/or cottonseed oil.

23. A multi-textured cookie having a center with a soft and moist texture and a firm outer layer produced by baking a dough composition according to claim 17.

* * * * *